United States Patent [19]

Hoke

[11] 4,049,060

[45] Sept. 20, 1977

[54] SOD CUTTER

[76] Inventor: Clyde Rockwell Hoke, Rte. 3, Box 505, Statesville, N.C. 28677

[21] Appl. No.: 695,078

[22] Filed: June 11, 1976

[51] Int. Cl.² .................................................. A01B 45/04
[52] U.S. Cl. .................................................... 172/19
[58] Field of Search .................................... 172/19, 20

[56] References Cited

U.S. PATENT DOCUMENTS

| 1,829,335 | 10/1931 | Blue | 172/19 |
| 2,127,751 | 8/1938 | Picha | 172/19 |
| 3,034,586 | 5/1962 | Ditter | 172/19 |

FOREIGN PATENT DOCUMENTS

| 675,822 | 7/1952 | United Kingdom | 172/19 |

Primary Examiner—Paul E. Shapiro

Attorney, Agent, or Firm—Bell, Seltzer, Park & Gibson

[57] ABSTRACT

Sod cutting apparatus for attachment to an excavating machine such as a backhoe wherein an elongate blade for cutting a surface layer from the earth is positioned substantially parallel to the surface of the earth and at a controlled depth by an appropriate depth control. A cross bar spans the elongated blade and is pivotally connected thereto. The crossbar is detachably connected with a portion of an excavating machine whereby movement of the excavating machine adjacent the surface of the earth moves the depth control across the surface and the blade means through the earth so as to cut a surface layer from the earth. A sheet dispensing mechanism is provided for dispensing sheet material in interposition between the earth and the severed surface layer.

10 Claims, 6 Drawing Figures

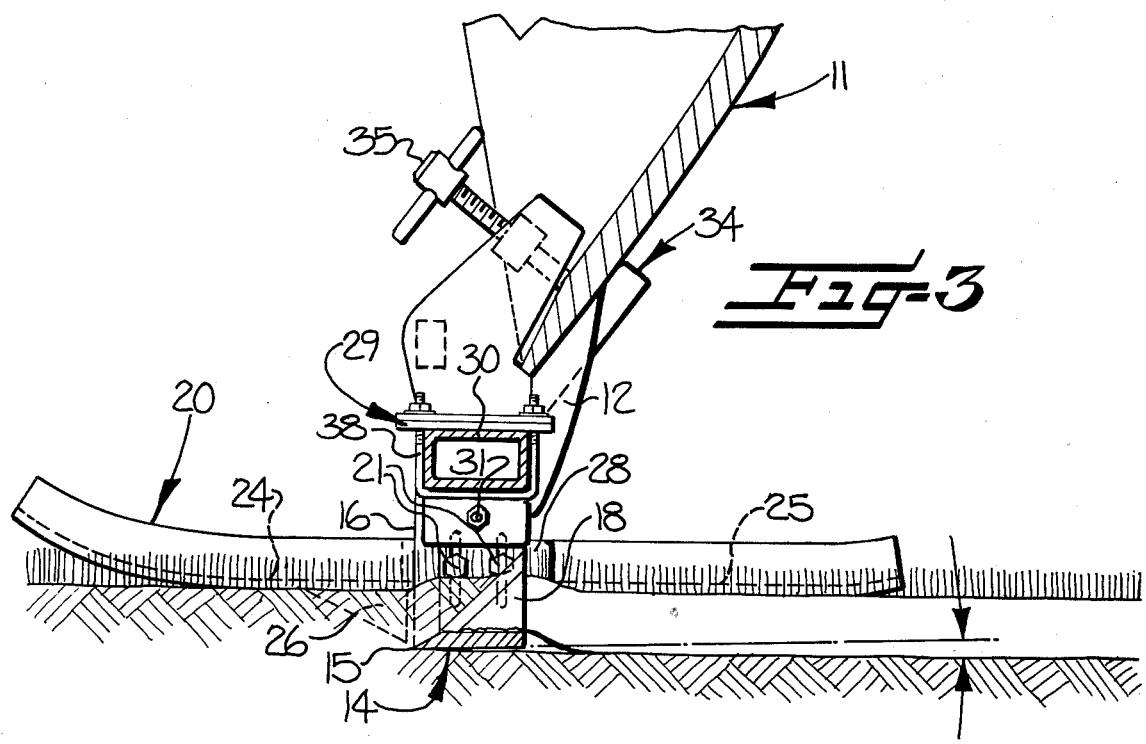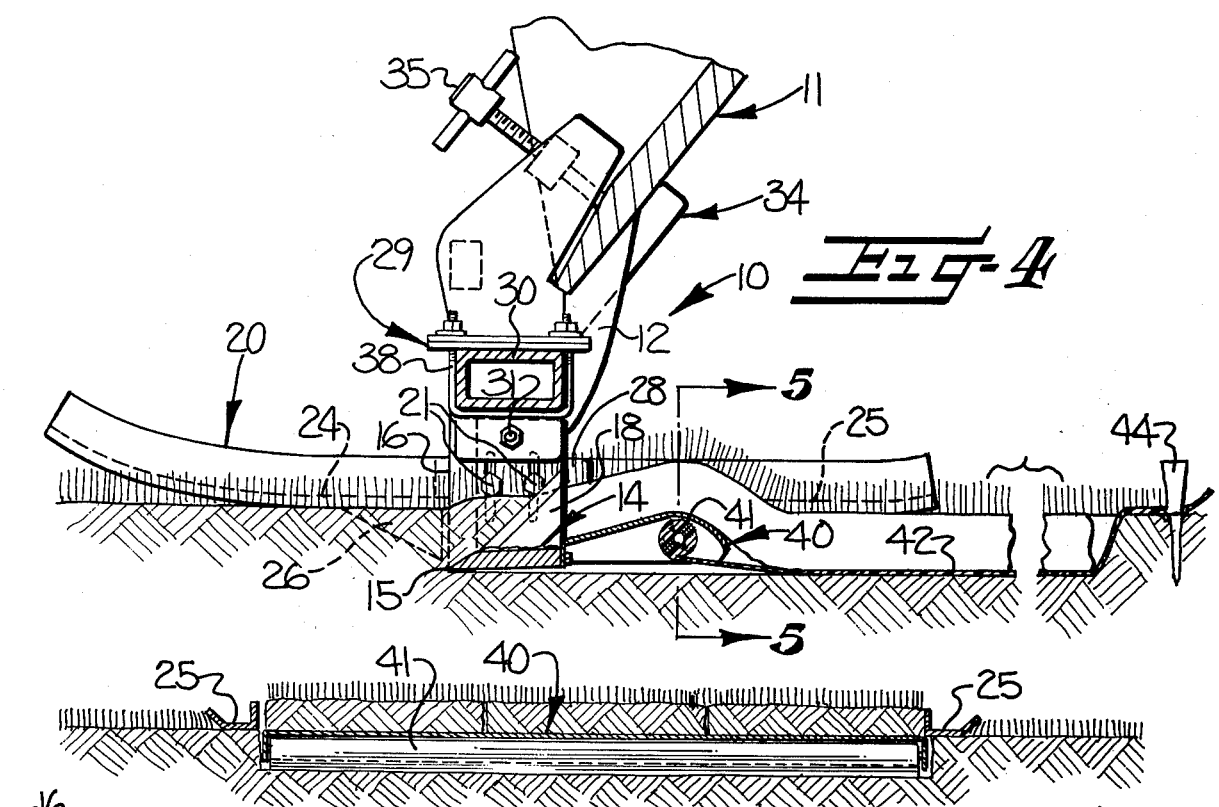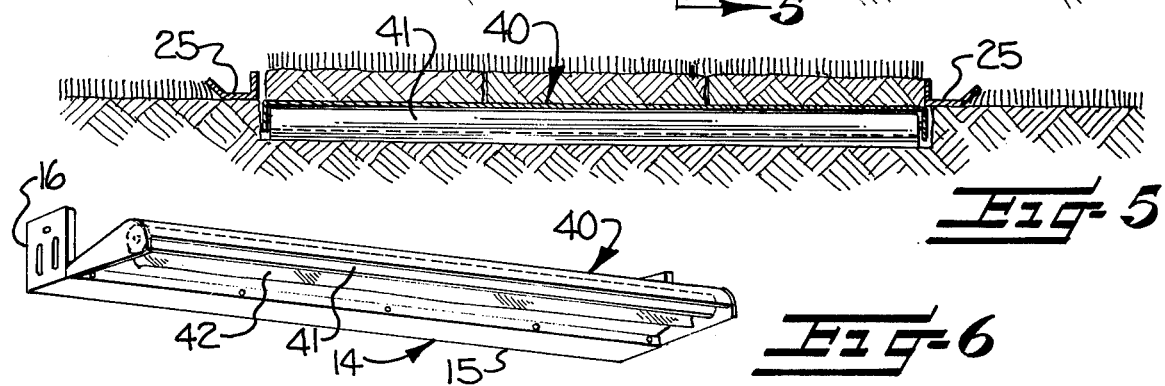

SOD CUTTER

In many excavating operations, for example for preparation of a grave site for burial, it is desirable to remove a surface layer of earth containing vegetation such as grass. Such a surface layer is commonly referred to as sod or a sod layer. While prior practice in certain special horticultural circumstances has been to carefully remove sod for later reinstallation or for installation at another site, the more usual practice for most excavations has been to simply make no effort at recovery of such sod. This more usual practice has developed due to the manual effort conventionaly required to remove and install or reinstall such sod.

One example of a particular excavation practice illustrative of the common practice is to be found in preparation of grave sites in cemeteries. Recent practice in grave site preparation depends upon the use of excavating machines such as backhoes or a specially designed driven bucket machine. With such machines, earth is relatively easily excavated from the grave site and the manual effort involved in removal and reinstallation of sod is not usually attempted. Nevertheless, cemetery operators readily acknowledge that recovery and reinstallation of sod would be valuable in more quickly restoring the grave site to a normal appearance. The comparable situation involved in other excavating operations will be readily recognized by persons working in the arts of excavation.

With the foregoing in mind, it is an object of this invention to facilitate the removal and recovery of sod from the site of an excavation. In realizing this object of the present invention, sod cutting apparatus is provided for detachable interconnection with an excavating machine such as a backhoe. Through use of the sod cutting apparatus of the present invention, an excavating machine operator may attach the sod cutting apparatus, cut and remove a sod layer, and then proceed with the desired excavation with minimal delay and interference while achieving a desired quick restoration of the excavation site to a more normal appearance.

Yet a further object of this invention is to facilitate the cutting of sod from the surface of the earth through the use of a sod cutting apparatus having a widthwise elongate blade for cutting a substantially horizontal surface layer from the earth, depth control devices operatively connected with the blade adjacent widthwise terminal ends thereof for positioning the blades substantially parallel to the surface of the earth, and mounting means operatively connected with the blade and the depth control for detachable engagement with an excavating machine bucket. In realizing this object of the present invention, an operator of an excavating machine may temporarily manually attach the blade and depth control to an excavating machine bucket such as a backhoe bucket and then cut a surface layer of sod from the earth by guiding the bucket adjacent the surface of the earth so as to move the depth control across the surface and the blade means through the earth.

Some of the objects of the invention having been stated, other objects will appear as the description proceeds, when taken in connection with the accompanying drawings, in which:

FIG. 3 is a side elevation view, partially in section, through the apparatus of FIG. 1;

FIG. 4 is a view similar to FIG. 3 showing an appartus in accordance with the present invention as incorporating certain modifications;

FIG. 5 is an elevation view, in section, taken generally along the line 5—5 in FIG. 4; and FIG. 6 is a perspective view, from below, of a portion of the apparatus of FIGS. 4 and 5.

While this invention will be described hereinafter with more particular reference to the accompanying drawings, in which preferred forms for the apparatus of this invention are shown, it is to be recognized at the outset that this invention is contemplated as capable of being embodied in forms other than those particularly shown and described. The description and illustrations are to be taken, accordingly, as a broad teaching directed to persons skilled in the applicable arts and not as limitations upon the scope of this invention.

In the accompanying drawings, the apparatus of the present invention (generally indicated at 10) is shown as attached to a bucket 11 of a backhoe (not shown in full). The bucket 11 (FIG. 1) has a plurality of teeth 12 protruding from a transverse edge or lip portion. While the present invention is shown in this specific environment, it is to be understood that the phrase "excavating machine" is intended to extend to other earth moving and digging machines including, by way of example and not by way of limitation, specialized grave digging machines, wheeled loaders, bulldozers and the like. The bucket 11 of a backhoe has been chosen for illustration here primarily because use of the sod cutting apparatus of this invention with a backhoe is known to be one particular area of significant use.

Figure 1:
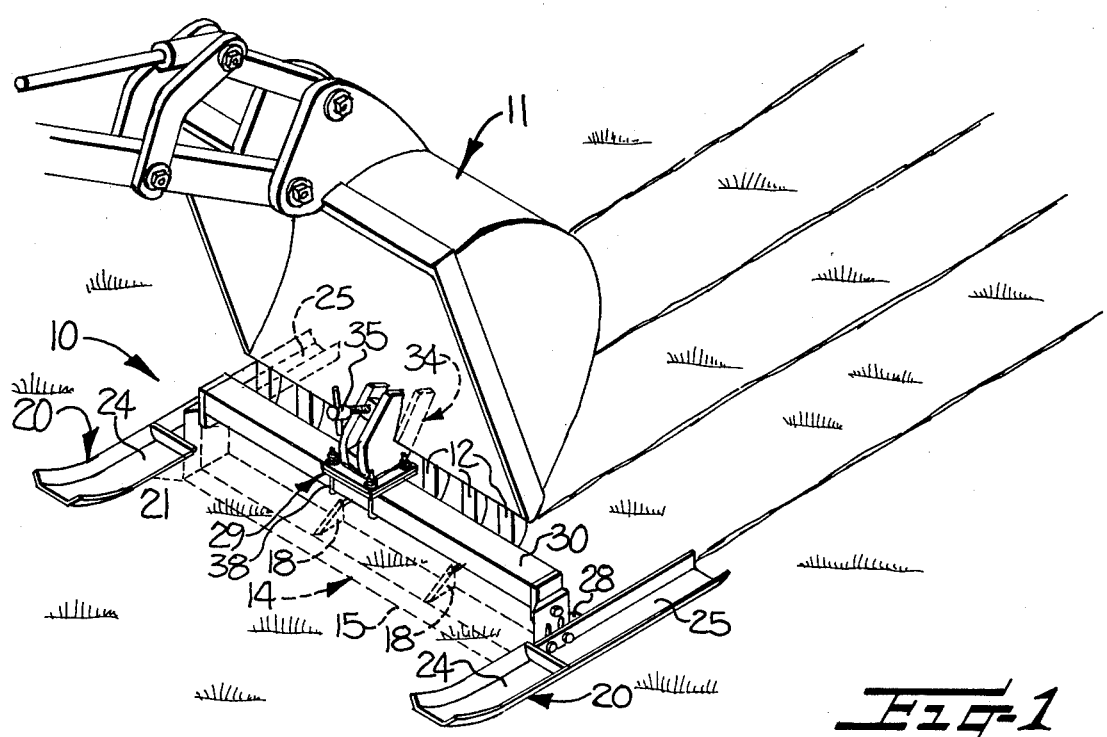
FIG. 1 is a perspective view, partially in phantom, showing the sod cutting apparatus of the present invention in use in conjunction with a backhoe bucket.

The sod cutting apparatus 10 of the present invention includes an elongate blade means generally indicated at 14 for cutting a surface layer from the earth. In the form illustrated, the blade means 14 comprises a widthwise elongate leading edge 15 for substantially horizontal disposition during use. Vertically extending edges 16, 18 rise from adjacent the leading edge 15 for severing a surface layer of earth into a strip or strips of known width (FIG. 1). In the form illustrated, two vertically extending edges 16 are spaced at opposite ends of the leading edge 15 and are provided on upright connecting portions of the blade means 14. Additionally, two vertically extending edges 18 are spaced intermediate the width of the leading edge 15 so that the sod layer cut from the surface of the earth is divided into three parts (FIG. 1). As will be appreciated by persons skilled in the applicable excavating arts, the width of the blade means 14 may be in varying dimensions up to the maximum required for a particular excavation, such as 48 inches. In the instances of a relatively wide blade means 14, removal and reinstallation of sod is facilitated by having the sod be of some shorter width, such as 16 inches. Sod having a 16 inch width or less may be more readily rolled, lifted and unrolled by an excavating machine operator or other operative.

Depth control means shown in the form of a pair of sled means generally indicated at 20 are operatively connected with the blade means 14 for positioning the same substantially parallel to the surface of the earth. As shown, the sled means 20 are secured to the upright connecting portions of the blade means 14 by appropriate threaded fasteners such as bolts 21 and cooperating nuts 22. The bolted connection of the sled means 20 with the blade means 14 is accomplished through vertically extending slots, permitting adjustment of the depth of cut of the blade means 14 and thus of the thickness of the sod severed from the surface of the earth.

Figure 2:
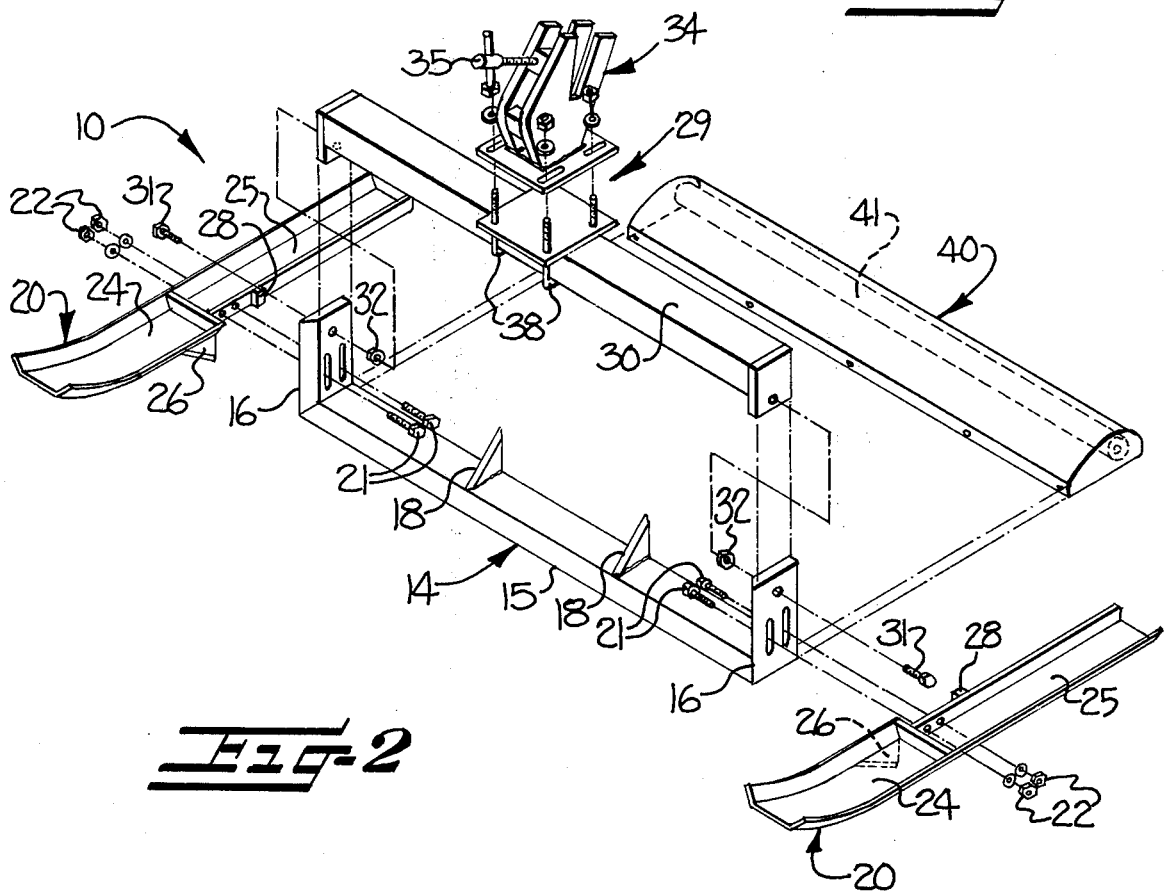
FIG. 2 is an exploded perspective view of elements of the apparatus of the present invention.

The sled means 20 have certain features which contribute to the desired operation of the sod cutting apparatus of the present invention. First, a forward portion 24 of the sled means 20 has a greater width than a rearward portion 25 thereof (FIG. 2). By such an arrangement, the vertically extending edges 16 spaced at opposite ends of the leading edge 15 are protected and shielded. Additionally, the forward portions 24 of the sled means 20 have dependent appear means 26 for slitting the surface of the earth in advance of the vertically extending edges 16. The dimension of the sled means 20 transversely of the blade means 14 (or fore and aft during use of the apparatus) is such as to stabilize the position of the blade 14 during an excavating machine stroke which may move the bucket 11 through varying angulations. Further, the sled means 20 include stop members 28 (one of which is visible in FIG. 2) for engaging a rear surface of the blade means 14 and stabilizing the interconnection of those elements.

The apparatus 10 of the present invention additionally includes mounting means operatively connected with the blade means and the depth control means for detachable engagement with a portion of an excavating machine, so that movement of the excavating machine adjacent the surface of the earth moves the depth control means across the surface and the blade means through the earth, cutting a layer of sod therefrom. In the form illustrated, the mounting means, generally indicated at 29, comprises crossbar means 30 spanning the blade means 14 and pivotally connected thereto at the upright connecting portions for accommodating varying angulations of the excavating machine with respect to the surface of the earth. More particularly, pivotal mounting of the crossbar 30 relative to the blade 14 is accomplished by a pair of mounting bolts 31 and associated nuts 32. During use of the apparatus, the crossbar 30 may pivot relative to the blade 14 during a stroke of the bucket 11, assuming various angulations as necessary to accommodate the position of the driving portion of the excavating machine.

The mounting means 29 further comprises clamp means 34 adjustably mounted on the crossbar 30 for accommodating varying placement of excavating machine components to be engaged. More particularly, a manually operable clamp screw 35 and associated clamp jaws are positioned substantially medially of the crossbar 30 by an arrangement of U-bolts 38. Desirably, the clamping means is adjusted relative to the crossbar 30 in such a manner as to assure that any teeth provided on an excavating machine bucket 11 (as indicated at 12 in FIGS. 3 and 4) are brought into engagement with the crossbar 30 to facilitate transfer of driving force to the apparatus of this invention.

In use of the form of the apparatus of this invention described to this point, an excavating machine operator positions an excavating machine bucket adjacent the surface of the earth and manipulates the clamping means 34 in such a manner as to engage components of the bucket within the clamp structure and with the crossbar 30. The hand clamp screw 35 is tightened to detachably secure the apparatus of this invention to the excavating machine. The excavating machine then may be operated in the substantially conventional manner to pass the bucket 11 adjacent the surface of the earth while severing a sod layer from the earth with the apparatus of this invention. The sod may then be rolled and lifted, the apparatus of the present invention removed from the excavating machine, and excavation proceed as usual.

As will be noted from FIG. 3, the blade means 14 of the apparatus of the present invention has a particular angulation during cutting, so that the sod being removed is lifted slightly. Such a slight angulation has been found to facilitate ready severance of the surface layer.

The present invention contemplates that the apparatus described to this point may be modified in order to facilitate removal and reinstallation of sod. More particularly, it is contemplated that provision may be made for interposing between the earth and a severed surface sod layer a sheet material facilitating removal and reinstallation of the sod. Such a modified form of the present invention is more particularly shown in FIGS. 4–6, with an added component being also illustrated in FIG. 2.

Referring now more particularly to those figures, this invention contemplates that a dispenser generally indicated at 40 may be attached to a trailing edge of the blade means 14, for receiving a roll 41 of sheet material 42 and dispensing the sheet material during use of the apparatus. As particularly shown in FIG. 4, the sheet material 42 may be secured to the surface of the earth by appropriate pins 44 or the like prior to beginning the cutting of a sod layer. During cutting, sheet material 42 is unwound from the roll 41 and is interposed or laid between the sod layer and the earth. With such interposition of the sheet material, rolling of the sod is facilitated. Where the sheet material is some degradable material providing the effect of a fertilizer on decomposition, the sheet material may be left in place with reinstalled sod so as to facilitate prompt re-establishment of plant root systems in the sod.

In the drawings and specification, there has been set forth a preferred embodiment of the invention, and although specific terms are employed, they are used in a generic and descriptive sense only and not for purposes of limitation.

That which is claimed is:

1. Sod cutting apparatus for attachment to an excavating machine such as a backhoe and comprising elongate blade means for cutting a surface layer from the earth, depth control means operatively connected with said blade means for positioning the same substantially parallel to the surface of the earth, and mounting means operatively connected with said blade means and said depth control means for detachable engagement with a portion of an excavating machine and comprising crossbar means spanning said blade means and pivotally connected thereto for accommodating varying angulations of the excavating machine with respect to the surface of the earth whereby movement of the excavating machine adjacent the surface of the earth moves said depth control means across the surface and said blade means through the earth and cuts a surface layer therefrom.

2. Sod cutting apparatus according to claim 1 wherein said blade means comprises a widthwise elongate leading edge for substantially horizontal disposition during use and vertically extending edges for severing the surface layer of earth into a strip of known width.

3. Sod cutting apparatus according to claim 2 wherein said vertically extending edges are spaced at opposite ends of said leading edge.

4. Sod cutting apparatus according to claim 2 wherein said vertically extending edges are spaced intermediate the width of said leading edge.

5. Sod cutting apparatus according to claim 1 wherein said mounting means further comprises clamp means adjustably mounted on said crossbar means for accommodating varying placement of excavating machine components to be engaged.

6. Sod cutting apparatus for attachment to a backhoe bucket and comprising widthwise elongate blade means for cutting a substantially horizontal surface layer from the earth, depth control means operatively connected with said blade means adjacent widthwise terminal ends thereof for positioning said blade means substantially parallel to the surface of the earth, crossbar means spanning and pivotally connected with said blade means and said depth control means, and clamp means mounted medially of said crossbar means for detachable engagement with a backhoe bucket whereby movement of the bucket adjacent the surface of the earth moves said blade means through the earth and cuts a surface layer therefrom.

7. Sod cutting apparatus according to claim 6 wherein said blade means comprises means for dispensing sheet material in interposition between the earth and the severed surface layer.

8. Sod cutting apparatus adapted for use as an attachment to an excavating machine such as a backhoe and comprising:
- elongate blade means for cutting a surface layer from the earth,
- depth control means substantially rigidly connected with said blade means for positioning the same substantially parallel to the surface of the earth and for gauging the thickness of the layer cut from the earth, and
- mounting means for detachable engagement with a transverse lip portion of an excavating machine and pivotally connected with said blade means and said depth control means for positioning said blade means substantially parallel to said transverse lip portion while accommodating varying angulations of the excavating machine with respect to the earth during engagement of said blade means and said depth control means with the earth.

9. Sod cutting apparatus according to claim 8 wherein said depth control means comprises sled means operatively connected with said blade means adjacent widthwise terminal ends thereof and extending transversely thereof for positioning said blade means in predetermined angular orientation to the earth during passage of said blade means therethrough.

10. Sod cutting apparatus according to claim 9 wherein said sled means comprise dependent opener means for slitting the surface of the earth in advance of said blade means.

* * * * *